Patented June 27, 1939

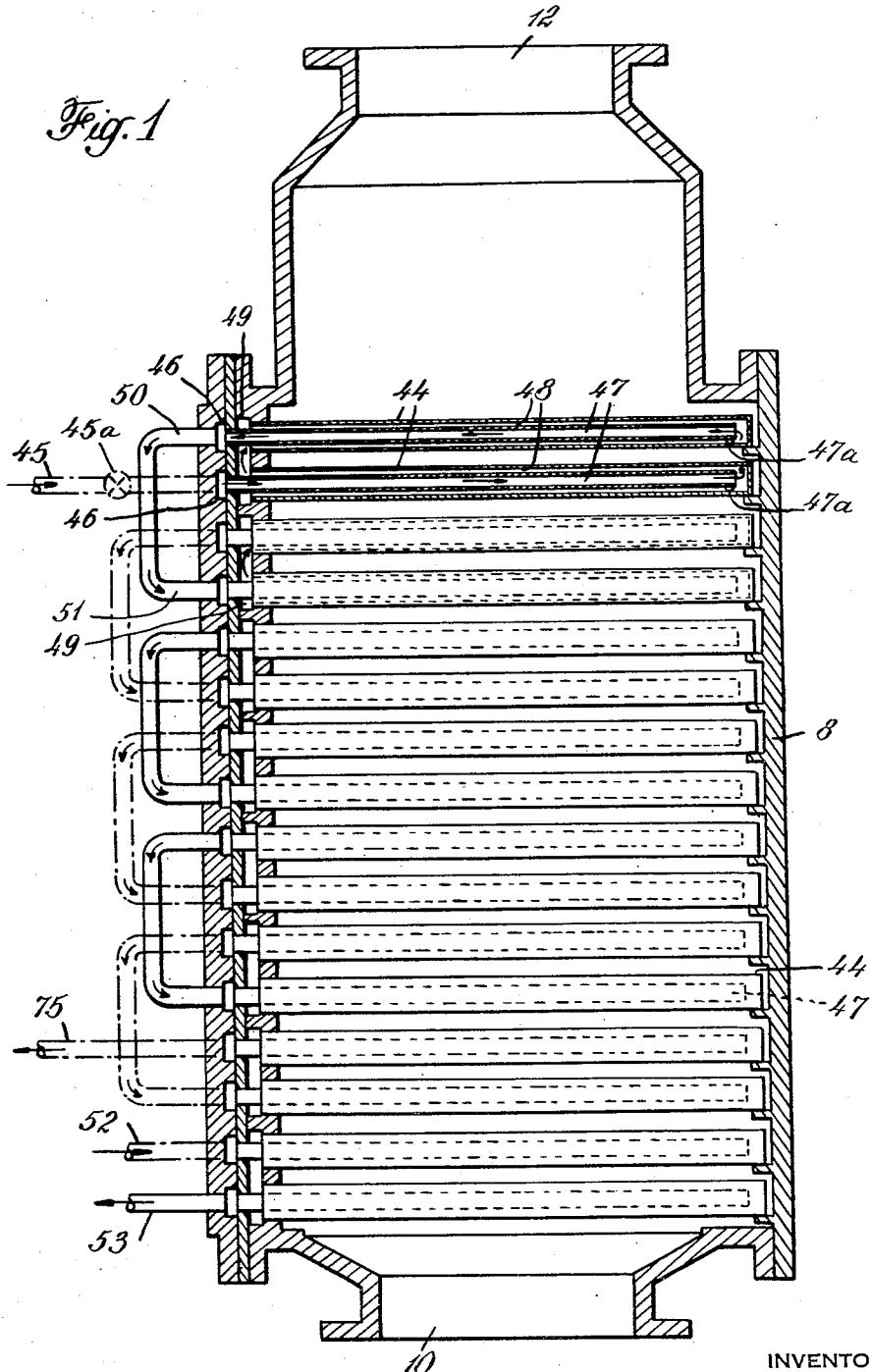

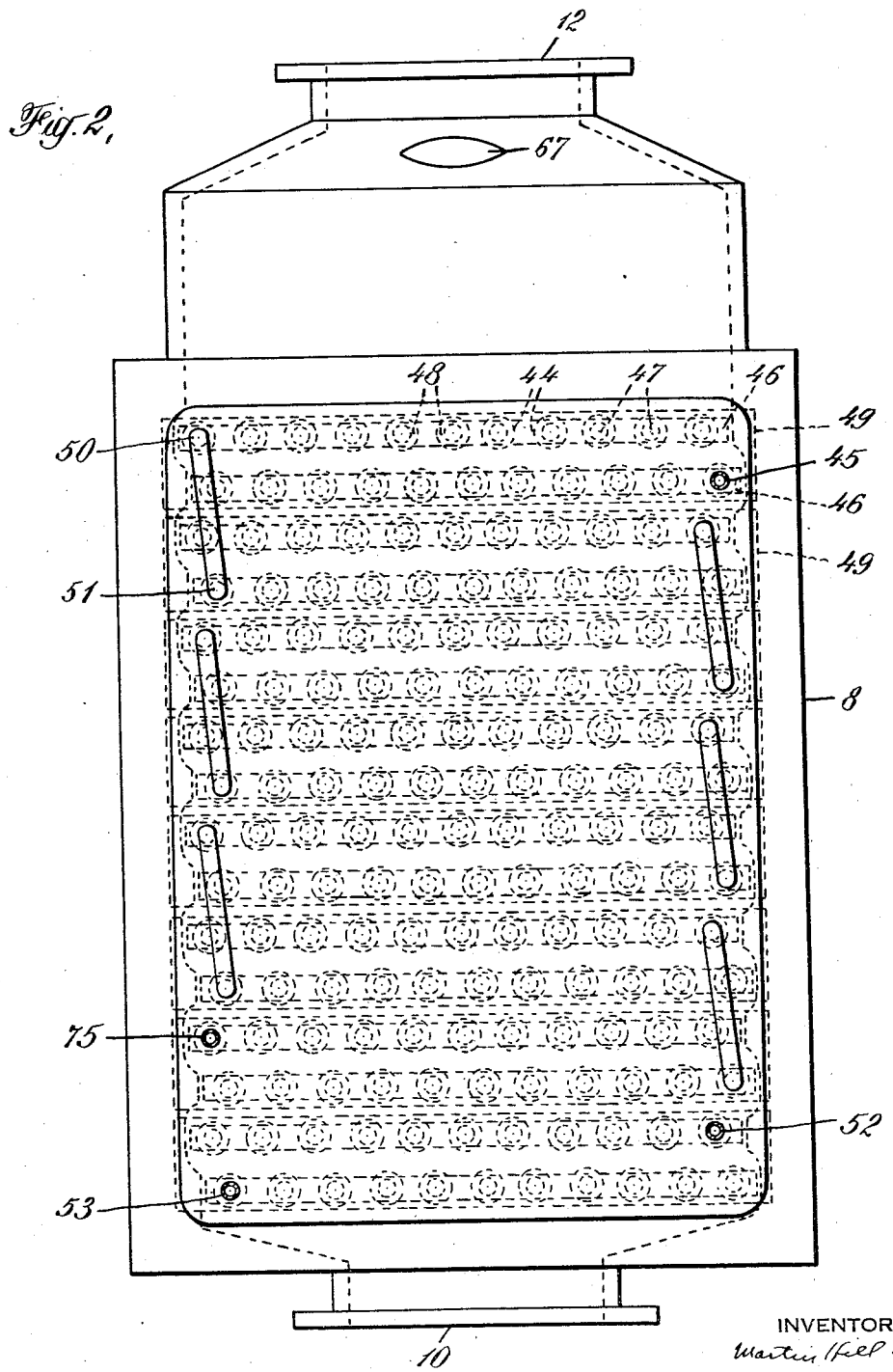

2,164,276

UNITED STATES PATENT OFFICE 2,164,276

DISTILLATION OF GLYCERIN

Martin Hill Ittner, Jersey City, N. J., assignor to Colgate-Palmolive-Peet Company, Jersey City, N. J., a corporation of Delaware Original applications December 23, 1935, Serial No. 55,783, and June 11, 1936, Serial No. 84,740. Divided and this application November 8, 1938, Serial No. 239,431

4 Claims. (Cl. 202—185)

This invention relates to improved apparatus for the distillation and purification of volatile substances having a considerably higher boiling point than water and particularly those which are miscible with water in their higher and lower concentrations, particularly glycerin.

This application is a division of my applications Serial No. 55,783, filed December 23, 1935, and Serial No. 84,740, filed June 11, 1936, as a division of said application Serial No. 55,783.

The apparatus of the present invention includes a condenser-concentrator for condensing a high boiling liquid from hot vapors containing the liquid, steam, volatile impurities, etc. As the apparatus has important advantages for use in the distillation of glycerin, the invention will be explained in connection with the distillation of glycerin, although it is applicable to the distillation of other liquids, as stated above.

In prior processes for the distillation of glycerin, the glycerin is volatilized in a still with the aid of open steam and a vacuum, and the resulting hot vapors, including glycerin, steam, etc., are passed through condensers in which much of the glycerin is condensed with condensation of as little water vapor as possible. The vapors after passing through the condensers, and after the condensation of much of the glycerin, are then finally condensed with the formation of a dilute aqueous glycerin solution commonly termed "sweet water".

The apparatus of the present invention permits the substantially complete condensation of glycerin from such hot vapors and its recovery as highly concentrated glycerin without any substantial condensation of water vapor, and without formation of sweet waters. It is advantageously used as the final glycerin condensing element in the systems described in my said prior applications Serial Nos. 55,783 and 84,740.

In the apparatus of the invention, a condenser-concentrator is provided in which glycerin is condensed from hot vapors from a still containing glycerin, steam, volatile impurities, etc., as glycerin and aqueous glycerin solutions of various concentrations, with means for continuously concentrating the more dilute glycerins and aqueous glycerin solutions condensed within said condenser-concentrator to produce concentrated glycerin; with means for drawing off and collecting said concentrated glycerin; and means for conveying excess water vapors from said condenser-concentrator to a suitable vacuum apparatus so as to maintain a suitable partial vacuum within the still and condenser.

I have made a study of the concentrations of mixtures of pure glycerin and water that will exist in the presence of an excess of water vapor under various conditions of heat and pressure unfavorable to the liquefaction of pure water vapor, and the concentrations of glycerin and glycerin solutions that will condense from a mixture of glycerin and water vapors under such conditions, and have found that in each case the concentration of the liquid glycerin or aqueous glycerin solution that will exist in a state of equilibrium in the presence of excess water vapor is very definite and is dependent solely on the pressure of the vapors present and temperature of the glycerin or glycerin solution.

The condenser-concentrator of the invention may be used for the condensation of substantially all of the glycerin from the hot vapors from the still as concentrated glycerin, or some of the glycerin may be condensed in an initial condenser, with condensation of substantially all of the remaining glycerin in the condenser-concentrator and its recovery therein as concentrated glycerin, thus avoiding in either case the necessity of producing sweet waters. The use of the condenser-concentrator as one element of a distillation system such as described in my said prior applications has important advantages; but nevertheless, the condenser-concentrator may be used in other types of distillation systems, supplemented by one or more condensers, or may be used as the sole condenser in a distillation system, with condensation of all the glycerin in the condenser-concentrator. The condenser-concentrator may be constructed with increased condensing surface, or two units may be connected in tandem with suitable connections so that the first will condense part of the glycerin and the second the remainder, if desired.

The invention will be further described in connection with the accompanying drawings, which show, in a somewhat conventional and diagrammatic manner, apparatus which embodies the invention, but it is not limited thereto.

In the accompanying drawings:

Fig. 1 is a vertical sectional view with parts in elevation of the condenser-concentrator; and Fig. 2 is a view in elevation of the condenser-concentrator taken at right angles to that of Fig. 1.

The condenser-concentrator 8 is provided with a plurality of banks of condensing and concentrating pipes 44. These are cooled near the top of the condenser with cold water entering at 45. The condenser-concentrator 8 is so designed that the cold water entering at the top will flow gradually downward, instead of upward as is customary in surface condensers. In order that the condensing and concentrating pipes 44 may at all times be filled with water in that portion of the apparatus through which condensing water is allowed to flow, and not accumulate air or steam in pockets, I have devised an arrangement of the pipes so that the flow of water will be locally upward through the tubes 44, though generally downward. This is accomplished by permitting the cold condensing water to enter through valve 45a at the inlet 45 which is at the second bank of tubes from the top, and causing the water to flow first through the tubes of this bank and then through the tubes of the top row and out at the outlet 50 from the top row to an outlet which connects with an inlet 51 to the fourth row from the top, so that the water flows through the fourth row and then through the third row from the top, then downwardly to the sixth bank or row of tubes and upward to the fifth bank of tubes, and so on.

By reference to Figs. 1 and 2, it will be seen that there are smaller tubes 47 located within the larger tubes 44, and that the small inner tubes 47 connect with slotted spaces 46 at their ends, while the outer larger tubes 44 have slotted spaces 49 at one end connecting the ends of two adjacent rows of tubes. The smaller tubes, at their inner ends, have a small spur 47a on their under sides for support and open into the larger tubes, as shown. The arrangement is such that the water which enters the second slotted space 46 leading to the inner portions of the inner tubes 47 of the second bank of tubes, passes through these tubes and into the space 48 between the smaller tubes 47 and the larger tubes 44 of the second row of tubes, then out of the ends of the larger tubes into the space 49 and then to the ends of the larger tubes of the top row, then through these large tubes and back through the smaller tubes to the slotted space 46 of the top row of tubes and then out at 50. Since the outlet is from the upper row of tubes, any air or vapors are forced outwardly with the water and down into the inlet of the fourth row of tubes. The arrangement is such that the water from the upper row of tubes passes down into the slotted space at the ends of the small tubes of this fourth row, in the manner described, and then upwardly to the third row and through the third row of tubes, and then outwardly and down to the inlet of the sixth row of tubes, and then through the sixth row and the fifth row, and so on. In the alternate rows of tubes, e. g., the second, fourth, and sixth rows, etc., the flow is inwardly from the slotted spaces 46 to the inner small tubes 47, then back through the space 48 between the inner tubes and the outer tubes, then upwardly through the slotted space 49 to the inlet of the larger tubes of the next row, then through the space between the larger tubes and the inner tubes, and back through the inner tubes to the slotted space 46 of this next row, e. g., the first, third, and fifth rows, etc.

The water may thus be led through all of the banks of tubes and be withdrawn from the outlet at the next to the bottom row of tubes; or the condensing water can be withdrawn before permitting it to traverse all of the banks of tubes. This latter arrangement is an advantageous one since the lower rows of tubes can then be utilized for heating the lower part of the condenser-concentrator, by added means, such as steam. In the apparatus illustrated in Figs. 1 and 2, the water outlet is from the fourth row of tubes from the bottom, through the outlet pipe 75.

The lower two rows of tubes in the condenser-concentrator 8 are shown as connected with a steam supply for heating these tubes. The steam line 52 enters the next to the bottom row of tubes so that the steam can pass through this row of tubes and then through the lower row of tubes and then to the outlet 53. Such an arrangement provides for heating one or more pairs of rows of tubes at the bottom of the condenser-concentrator with steam to increase the concentrating effect instead of depending on hot water gradually heated by the heat absorbed in its downward flow through the tubes of this apparatus.

By reference to Fig. 2 it will be seen that the tubes of the different rows or banks in the condenser-concentrator 8 are not placed directly under the tubes of the next higher row or bank, nor are they placed directly under the spaces between the tubes of the next higher row or bank. Instead, the tubes of each bank are shifted slightly side-wise from the tubes of the bank immediately above and below, with the result that vapors may not travel directly through the banks of tubes without being diverted in their course, and with the further result that water and dilute glycerin solutions condensing on the upper colder tubes may not drip off through the open spaces of the tubes beneath but will fall so as to strike the tubes of the next lower bank. This arrangement is an advantageous one, since, in this way, the more dilute glycerin solutions condensing on the upper, colder tubes fall in their downward course to successively hotter and hotter tubes, and there lose a portion of their water and become progressively more and more concentrated until they reach the bottom tubes which are at the highest temperature, and where it is desirable to heat the tubes with steam from an outside source or hot water that may be permitted to reach the boiling point through heat accumulated by the condensation of aqueous glycerin solutions in this part of the apparatus and by absorbing heat in cooling the hot vapors entering at the bottom of the condenser-concentrator 8.

The tube surface maintained in the condenser-concentrator 8 is sufficient to condense all of the glycerin as aqueous glycerin solutions of various concentrations, depending on the temperatures of the water in the various banks of tubes; but the total tube surface is preferably not sufficient to condense more water as water or dilute glycerin than can be re-evaporated by the excess heat of the vapors entering at the bottom and absorbed by the tubes and accumulated in the lower banks of tubes, or by excess heat in the form of steam supplied to the lower banks of tubes. A controlled flow of cold water through valve 45a and inlet pipe 45 may be relied upon to give more or less cooling of the pipes 44 as desired. The arrangement is advantageously such that the glycerin is condensed with substantial completeness before the cooled vapors leave the upper rows of tubes, so that practically glycerin-free water vapor, etc., leaves the top of the apparatus; while the heat interchange and heating of the condensed glycerin is advantageously such that the glycerin which finally escapes from the bottom rows of tubes, after concentration thereon, is concentrated glycerin.

The hot vapors, including glycerin vapors, water vapor, etc., enter the condenser-concentrator at the bottom through the opening 10 and flow upwardly and generally countercurrent to the cooling medium with the uncondensed vapors leaving the top of the apparatus through the opening 12 to a suitable vacuum apparatus. The vapors which leave contain substantially no glycerin, and include substantially all of the water vapor entering the apparatus, including water vapor which is not condensed and water vapor resulting from the condensation and re-evaporation in the apparatus. The condensation and concentration which takes place in the apparatus is largely as the result of indirect heat transfer through tubes 44 but it will be understood that the cooled descending condensates and concentrates are also acted upon directly to some extent by hot ascending vapors with further concentration of the condensate and condensation of the less volatile vapors, as glycerin.

In the drawings, no heat insulation is shown on the apparatus, but it will be understood that, in actual construction and operation, good heat insulating covering may be provided. Suitable peep glasses may be provided on different parts of the apparatus to permit observation of the progress of the condensation, such as the peep glass 67 on the dome of the apparatus.

The arrangement of condensing and concentrating tubes in my condenser-concentrator is also such as to leave free passages for uncondensed vapors between these tubes. As already explained I stagger the tubes above one another in such a way that vapors will necessarily be deflected in their passage through the condenser-concentrator, and so that condensed aqueous glycerin solutions dripping from one set of tubes will fall successively to tube of lower banks which are successively hotter and which successively evaporate additional quantities of water from the refluxing glycerin solutions until the reflux drips from the lowest steam heated or very hot tubes as highly concentrated refined glycerin. It can thus be seen that the condensation and concentration in my condenser-concentrator are at all times capable of accurate control and can be made complete inasmuch as the upper tubes are at all times kept cold, while the bottom tubes are always kept hot and the intermediate tubes are all substantially evenly graduated in temperature.

The condenser-concentrator will effectively condense and concentrate all glycerin that is passed through it. If, in the distillation system, the condenser-concentrator is preceded by one or more other condensers, it will condense and concentrate what ever glycerin passes through the other condensers. If no other condensers are used, it will condense substantially all of the glycerin from the still. It condenses glycerin of all concentrations at the same time from the most dilute, which may be practically of zero concentration in the upper part of the condenser-concentrator, to glycerin of around 99% concentration or over in the lower heated portion of the concentrator. This condenser-concentrator is so constructed and operated that the more dilute glycerin solutions condensed in the upper portion, falling downwardly from one bank of pipes to the next hotter bank, become gradually concentrated to 99% or over, so that highly concentrated refined glycerin is drawn off from the bottom of the condenser-concentrator at the same time that the upper colder banks of tubes prevent the volatilization and loss of any appreciable amounts of glycerin from the apparatus.

If the condenser-concentrator is used as a part of a distillation system such as is described in my said prior applications, some 80% of the glycerin in the hot vapors may be condensed in the initial (boiler-) condenser as concentrated, refined glycerin, with the remaining 20% being recovered in the condenser-concentrator also as highly concentrated refined glycerin. In an ordinary operation, with such apparatus, the temperature of the admixed glycerin and steam vapors, etc. entering the bottom of the condenser-concentrator may be around 257° F. more or less. The vapors of water and impurities leaving the top of the condenser-concentrator will vary somewhat in temperature but may be for example around 120° F., more or less. The temperature of the cold water entering the condenser-concentrator will vary somewhat with climatic and other conditions and may be, e. g., around 60° F. and may be heated in passing through the tubes of the condenser-concentrator to approximately the boiling point or somewhat below the boiling point, e. g. around 150° F., depending upon the amount of water supplied and other considerations. Where the lower rows of coils in the condenser-concentrator are heated by steam the steam may enter at a temperature, e. g., around 228° F. below the temperature of the entering vapors of glycerin and water and will condense some glycerin and will assist these vapors in heating the condensed glycerin which drips down from the higher tubes on to these lower steam-heated tubes.

I claim:

1. In an apparatus for the distillation of high boiling liquids with the aid of open jet steam under diminished pressure, a condenser-concentrator for the condensation and concentration of high boiling liquids with the aid of a cooling liquid, said condenser-concentrator having an inlet for the vapors of the high boiling liquid and steam, etc. at the bottom and an outlet for uncondensed steam, etc. at the top, said condenser-concentrator having means for supplying a cooling liquid in its upper part and closed means with horizontally extending surfaces for causing the same to flow downwardly in a direction generally counter-current to the upwardly flowing vapors, and in indirect contact with the vapors and condensed liquid, means for removing said cooling liquid in the lower part of the apparatus and means for causing condensed liquid to flow downwardly in indirect contact with said cooling liquid and in direct contact with the vapors with resulting gradual heating of the cooling liquid by heat given up by condensation of aqueous high boiling liquid solutions, and concentration of the condensed liquid progressing downwardly through the apparatus, and heating means being provided in the lower portion of said condenser-concentrator to aid in the concentration of the condensed and downwardly flowing liquid.

2. An apparatus such as defined in the preceding claim having a number of horizontally arranged rows of tubes for the passage of cooling liquid therethrough, the alternate horizontal rows of tubes being so connected, and the alternate pairs of adjacent rows of tubes being so connected, that the cooling liquid will flow upwardly from one row of tubes to the next higher row of each pair and downwardly from one pair of rows of tubes to the next pair of rows of tubes.

3. A condenser-concentrator for the condensation and concentration of high boiling liquids from admixtures of vapors of such liquids and steam, etc., having an inlet for vapors in its lower part and an outlet for uncondensed steam, etc. in its upper part, means for supplying a cooling liquid in its upper part and causing said cooling liquid to flow in a generally downward direction countercurrent to the upwardly flowing vapors and in indirect contact therewith, means for causing condensate from said vapors to flow downwardly through said apparatus in indirect contact with said cooling liquid and in direct contact with said vapors, whereby the cooling liquid is gradually heated by heat absorbed in the cooling of said vapors and in condensing liquid therefrom and the condensate is concentrated as it progresses downwardly through the apparatus, heating means being provided in the lower part of the condenser-concentrator to aid in the concentration of the condensed and downwardly flowing liquid.

4. A condenser-concentrator having a plurality of substantially horizontal pairs of rows of tubes for the passage of cooling liquid therethrough, the alternate rows of tubes being so connected, and the alternate pairs of adjacent rows of tubes being so connected, that the cooling liquid will flow upwardly from one row of tubes to the next higher row of each pair and downwardly from one pair of rows of tubes to the next pair of rows of tubes in a generally downward direction, means for contacting upwardly flowing vapors containing vapors of high boiling liquids with the exterior surfaces of said tubes, means for removing upwardly flowing vapors uncondensed by said contacting and means for removing downwardly flowing liquids condensed thereby.

MARTIN HILL ITTNER.